United States Patent
Yamamoto et al.

(10) Patent No.: US 8,203,780 B2
(45) Date of Patent: Jun. 19, 2012

(54) SYSTEMS AND METHODS FOR IMPROVING THE PERFORMANCE OF A PHOTOREFRACTIVE DEVICE

(75) Inventors: Michiharu Yamamoto, Carlsbad, CA (US); Peng Wang, Oceanside, CA (US); Nasser Peyghambarian, Tucson, AZ (US); Weiping Lin, Carlsbad, CA (US)

(73) Assignees: Nitto Denko Corporation, Osaka (JP); Arizona Board of Regents on Behalf of the University of Arizona, Tuscon, AZ (US)

( * ) Notice: Subject to any disclaimer, the term of this patent is extended or adjusted under 35 U.S.C. 154(b) by 0 days.

(21) Appl. No.: 12/524,559

(22) PCT Filed: Jan. 2, 2008

(86) PCT No.: PCT/US2008/050056
§ 371 (c)(1),
(2), (4) Date: Nov. 17, 2009

(87) PCT Pub. No.: WO2008/091716
PCT Pub. Date: Jul. 31, 2008

(65) Prior Publication Data
US 2010/0060975 A1    Mar. 11, 2010

Related U.S. Application Data

(60) Provisional application No. 60/886,869, filed on Jan. 26, 2007.

(51) Int. Cl.
*G02F 1/29*    (2006.01)
(52) U.S. Cl. ...................................................... 359/315
(58) Field of Classification Search ................... 359/315
See application file for complete search history.

(56) References Cited

U.S. PATENT DOCUMENTS

| | | | | |
|---|---|---|---|---|
| 3,994,567 A | * | 11/1976 | Matsuo et al. | 349/132 |
| 5,064,264 A | | 11/1991 | Ducharme et al. | |
| 5,115,336 A | * | 5/1992 | Schildkraut et al. | 359/263 |
| 6,090,332 A | | 7/2000 | Marder et al. | |

(Continued)

FOREIGN PATENT DOCUMENTS

JP    2006171320    6/2006

(Continued)

OTHER PUBLICATIONS

D.S. Chemla et al., "Nonlinear Optical Properties of Organic Molecules and Crystals" (Academic Press, 1987), Table of Contents.

(Continued)

*Primary Examiner* — James Jones
(74) *Attorney, Agent, or Firm* — Knobbe, Martens, Olson & Bear, LLP

(57) ABSTRACT

A photorefractive device (100) and method of manufacture are disclosed. The device (100) comprises a layered structure in which one or more polymer layers (110) are interposed between a photorefractive material (106) and at least one transparent electrode layer (104). The layered structure is further interposed between a plurality of substrates (102). When a bias is applied to the device (100), the device (100) exhibits an increase in signal efficiency of approximately three to four times that of similar, but non-buffered, devices. Concurrently, the device (100) of the present disclosure utilizes approximately half the biased voltage, advantageously resulting in a longer device lifetime.

20 Claims, 4 Drawing Sheets

U.S. PATENT DOCUMENTS

| | | | |
|---|---|---|---|
| 6,094,413 A * | 7/2000 | Guerra | 369/275.1 |
| 6,185,033 B1 * | 2/2001 | Bosc et al. | 359/254 |
| 6,267,913 B1 | 7/2001 | Marder et al. | |
| 6,610,809 B1 | 8/2003 | Yamamoto et al. | |
| 6,646,107 B2 | 11/2003 | Moroishi et al. | |
| 6,653,421 B1 | 11/2003 | Yamamoto | |
| 6,809,156 B2 | 10/2004 | Yamamoto | |
| 2003/0158823 A1 | 8/2003 | Wu et al. | |
| 2004/0077794 A1 | 4/2004 | Yamamoto et al. | |
| 2004/0242841 A1 * | 12/2004 | Cammack et al. | 528/481 |
| 2006/0078803 A1 | 4/2006 | Takizawa et al. | |
| 2008/0039603 A1 | 2/2008 | Yamamoto et al. | |

FOREIGN PATENT DOCUMENTS

| | | |
|---|---|---|
| JP | 2006171321 | 6/2006 |

OTHER PUBLICATIONS

Ono H. et al., "Oriental Holographic Grating Observed in Liquid Crystals Sandwiched with Photoconductive Polymer Films," Applied Physics Letters, vol. 71, No. 9, pp. 1162-1164, Sep. 1, 1997.

Substantive Examination Report issued on Dec. 14, 2011, in the corresponding European Patent Application No. 08705645.3.

Kaczmarek M et al., "*The role of surface charge field in two beam coupling in liquid crystal cells with photoconducting polymer layers*," Journal of Applied Physics, American Institute of physics. New York, vol. 96, No. 5, Jan. 1, 2004, pp. 2616-2623.

Mun Junho et al., "*Transport and trapping of phtocharges in liquid crystals placed between photoconductive polymer layers*," Applied Physics Letters, AIP, American Institute of Physics, Melville, NY, vol. 79, No. 13, Sep. 24, 2001, pp. 1933-1935.

* cited by examiner

SYSTEMS AND METHODS FOR IMPROVING THE PERFORMANCE OF A PHOTOREFRACTIVE DEVICE

CROSS REFERENCE TO RELATED APPLICATIONS

This application is a U.S. National Phase of PCT International Application Number PCT/US20085/050056, filed on Jan. 2, 2008, designating the United States of America and published in the English language, which claims priority to U.S. Provisional Patent Application No. 60/886,869, filed on Jan. 26, 2007. The disclosures of the above-described applications are hereby incorporated by reference in their entirety.

BACKGROUND OF THE INVENTION

1. Field of the Invention

The invention relates to methods for improving the properties of photorefractive materials and to utilizing multiple layers to improve the performance, particularly the grating or image persistency of photorefractive materials.

2. Description of the Related Art

Photorefractivity is a phenomenon in which the refractive index of a material can be altered by changing the electric field within the material, such as by laser beam irradiation. The change of the refractive index is achieved by a series of steps, including: (1) charge generation by laser irradiation, (2) charge transport, resulting in the separation of positive and negative charges, (3) trapping of one type of charge (charge delocalization), (4) formation of a non-uniform internal electric field (space-charge field) as a result of charge delocalization, and (5) refractive index change induced by the non-uniform electric field. Therefore, good photorefractive properties can generally be seen in materials that combine good charge generation, good charge transport or photoconductivity, and good electro-optical activity.

Photorefractive materials have many promising applications, such as high-density optical data storage, dynamic holography, optical image processing, phase conjugated mirrors, optical computing, parallel optical logic, and pattern recognition. Originally, the photorefractive effect was found in a variety of inorganic electro-optical (EO) crystals, such as $LiNbO_3$. In these materials, the mechanism of the refractive index modulation by the internal space-charge field is based on a linear electro-optical effect. Usually inorganic electro-optical (EO) crystals do not require biased voltage for the photorefractive behavior.

In 1990 and 1991, the first organic photorefractive crystal and polymeric photorefractive materials were discovered and reported. Such materials are disclosed, for example, in U.S. Pat. No. 5,064,264, to Ducharme et al, the contents of which are hereby incorporated by reference. Organic photorefractive materials offer many advantages over the original inorganic photorefractive crystals, such as large optical non-linearities, low dielectric constants, low cost, light weight, structural flexibility, and ease of device fabrication. Other important characteristics that may be desirable, depending on the application, include long shelf life, optical quality, and thermal stability. These kinds of active organic polymers are emerging as key materials for advanced information and telecommunication technology.

In recent years, efforts have been made to optimize the properties of organic, and particularly polymeric, photorefractive materials. As mentioned above, good photorefractive properties depend upon good charge generation, good charge transport, also known as photoconductivity, and good electro-optical activity. Various studies have been performed to examine the selection and combination of the components that give rise to each of these features. The photoconductive capability is frequently provided by incorporating materials containing carbazole groups. Phenyl amine groups can also be used for the charge transport part of the material.

Particularly, several new organic photorefractive compositions which have better photorefractive performances, such as high diffraction efficiency, fast response time, and long phase stabilities, have been developed. For examples, see U.S. Pat. Nos. 6,809,156, 6,653,421, 6,646,107, 6,610,809 and U.S. Patent Application Publication No. 2004/0077794 (Nitto Denko Technical), all of which are hereby incorporated by reference. These patents and patent applications disclose methodologies and materials to make triphenyl diamine (TPD) type photorefractive compositions which show very fast response times and good gain coefficients.

Typically, a high biased voltage can be applied to photorefractive materials in order to obtain good photorefractive behavior. While using a high biased voltage can result in a longer grating persistency, the use of a high voltage in the photorefractive material can cause the photorefractive grating to disappear almost immediately after stopping the applied biased voltage. Therefore, there is a strong need to improve grating holding persistency, even if the biased voltage is stopped and no voltage is being applied.

SUMMARY OF THE INVENTION

One embodiment of the present disclosure provides a method for improving the performance of a photorefractive device comprising one or more transparent electrode layers and a photorefractive material. The method comprises interposing one or more polymer layers between the transparent electrode layer and the photorefractive material. In an embodiment, the peak diffraction efficiency bias of the photorefractive device after incorporating the one or more polymer layers in the photorefractive device is reduced when measured by using an approximately 532 nm laser beam, relative to a photorefractive device containing at least one transparent electrode layer and a photorefractive material without a polymer layer interposed there between.

In an embodiment of the method for improving the performance of a photorefractive device, the device comprises a first and a second electrode layers positioned adjacent the opposite sides of the photorefractive material, a first polymer layer interposed between the first electrode layer and the photorefractive material, and a second polymer layer interposed between the second electrode layer and the photorefractive material.

In an embodiment of the method for improving the performance of a photorefractive device, the polymer layer is selected from the group consisting of polymethyl methacrylate, polyimide, amorphous polycarbonate, siloxane sol-gel, and combinations thereof. In some embodiments, the polymer layer comprises amorphous polycarbonate.

The total combined thickness of the one or more polymer layers can vary over a wide range in the method of improving a photorefractive device. In an embodiment, the total combined thickness of the one or more polymer layers is from about 1 µm to about 80 µm. In an embodiment, the total combined thickness of the one or more polymer layers is from about 2 µm to about 40 µm. In an embodiment, the total combined thickness of the one or more polymer layers is from about 2 µm to about 30 µm. Where more than one polymer layer is used in the method for improving the photorefractive device, the thickness of each of the polymer layers can be independently selected. For example, each individual polymer layer can have a thickness from about 1 μm to about 40 μm. In an embodiment, each individual polymer layer has a thickness from about 2 μm to about 20 μm. In an embodiment, each individual polymer layer has a thickness from about 10 μm to about 20 μm. In an embodiment, each individual polymer layer has a thickness from about 2 μm to about 10 μm. In an embodiment, each individual polymer layer has a thickness from about 15 μm to about 20 μm.

In an embodiment, the polymer layer has a relative dielectric constant from about 2 to about 15. In an embodiment, the polymer layer has a relative dielectric constant from about 2 to about 4.5. In an embodiment, the refractive index of the polymer layer is from about 1.5 to about 1.7.

In a further embodiment of the method for improving the performance of a photorefractive device, the electrodes of the device comprise conducting films independently selected from the group consisting of metal oxides, metals, and organic films, with an optical density less than about 0.2. In an embodiment, the electrodes each individually comprise one of indium tin oxide, tin oxide, zinc oxide, polythiophene, gold, aluminum, polyaniline, and combinations thereof.

The photorefractive material can comprise a polymer that is organic or inorganic in the methods for improving the performance of a photorefractive device. In an embodiment, the photorefractive material comprises organic or inorganic polymers exhibiting photorefractive behavior and possessing a refractive index of about 1.7.

Another embodiment of the present disclosure provides a photorefractive device. The photorefractive device can be made according to the methods described herein. In an embodiment, the photorefractive device comprises a photorefractive material, a first electrode layer and a second electrode layer; and at least one polymer layer interposed between the first electrode layer and the photorefractive material.

In an embodiment, the photorefractive device comprises a first polymer layer and a second polymer layer, wherein the first electrode layer and the second electrode layer are positioned adjacent opposite sides of the photorefractive material. In an embodiment, the first polymer layer is interposed between the first electrode layer and the photorefractive material. In an embodiment, the second polymer layer is interposed between the second electrode layer and the photorefractive material. In an embodiment, the photorefractive device comprises a plurality of substrate layers, a plurality of electrode layers interposed between the substrate layers, a plurality of polymer layers interposed between the electrode layers, and a photorefractive layer interposed between the polymer layers. Additional layers can be further incorporated, if desired.

In an embodiment, the polymer layers are selected from the group consisting of polymethyl methacrylate, polyimide, amorphous polycarbonate, siloxane sol-gel, and combinations thereof. In an embodiment, the polymer layers comprise amorphous polycarbonate. The polymer layers of the photorefractive device can also possess a relative dielectric constant of from about 2 to about 15. In some embodiments, the photorefractive device has a relative dielectric constant of from about 2 to about 4.5. The refractive index of the polymer layers in the photorefractive device can be from about 1.5 to about 1.7.

The thickness of the one or more polymer layers in the photorefractive device can vary over a wide range. In an embodiment, the total combined thickness of the one or more polymer layers is from about 1 μm to about 80 μm. In an embodiment, the total combined thickness of the one or more polymer layers is from about 2 μm to about 40 μm. In an embodiment, the total combined thickness of the one or more polymer layers is from about 2 μm to about 30 μm. Where more than one polymer layer is present in the photorefractive device, the thickness of each of the polymer layers can be independently selected. For example, each individual polymer layer can have a thickness from about 1 μm to about 40 μm. In an embodiment, each individual polymer layer has a thickness from about 2 μm to about 20 μm. In an embodiment, each individual polymer layer has a thickness from about 10 μm to about 20 μm. In an embodiment, each individual polymer layer has a thickness from about 2 μm to about 10 μm. In an embodiment, each individual polymer layer has a thickness from about 15 μm to about 20 μm.

In an embodiment, the photorefractive device comprises a substrate attached to the first electrode layer at the side opposite the polymer layer. In an embodiment, the substrate of the photorefractive device comprises at least one of soda lime glass, silica glass, borosilicate glass, gallium nitride, gallium arsenide, sapphire, quartz glass, polyethylene terephthalate, and polycarbonate. In some embodiments, the substrate comprises a material possessing an index of refraction less than about 1.5.

In an embodiment, the electrodes in the photorefractive device each comprise conducting films independently selected from the group consisting of metal oxides, metals, and organic films, with an optical density less than about 0.2. In an embodiment, the one or more electrodes each individually comprise one of indium tin oxide, tin oxide, zinc oxide, polythiophene, gold, aluminum, polyaniline, and combinations thereof.

In an embodiment of the photorefractive device, the photorefractive material comprises organic or inorganic materials exhibiting photorefractive behavior and possessing a refractive index of about 1.7. In some embodiments of the photorefractive device, the peak diffraction efficiency bias of the photorefractive device containing the plurality of polymer layers is reduced compared to a photorefractive device without the polymer layers when measured by an approximately 532 nm laser beam.

Surprisingly, the grating persistency of the photorefractive device comprising a polymer layer can be extended and held for long period of time, as compared to a photorefractive device without a polymer layer, when measured by an approximately 532 nm laser beam. Grating persistency values (time of grating drop to 1/e of the initial value) that are surprisingly long have been measured in the photorefractive devices described herein. In an embodiment, the grating persistency of the photorefractive device is 1 minute or more when measured by an approximately 532 nm laser beam. In an embodiment, the grating persistency of the photorefractive device is 1 hour or more when measured by an approximately 532 nm laser beam. In an embodiment, the grating persistency of the photorefractive device is 2 hours or more when measured by an approximately 532 nm laser beam. In an embodiment, 90% of the grating remains even after 60 hours storage of the photorefractive device.

DETAILED DESCRIPTION OF THE PREFERRED EMBODIMENT

The present disclosure relates to systems and methods for improving the performance of photorefractive devices comprising at least one or more transparent electrode layers and a photorefractive material. One or more polymer layers are interposed between the transparent electrode layers and the photorefractive material, where the peak diffraction efficiency bias of the photorefractive device after incorporating the one or more polymer layers is reduced. In one example, the reduction may be measured using an approximately 532 nm laser beam. Advantageously, as discussed in greater detail below, this design lowers the biased voltage required to operate the device and, as a result, improves the device lifetime. Photorefractive devices based upon this design may be used for a variety of purposes including, but not limited to, holographic data storage and image recording materials and devices.

Figure 1A:
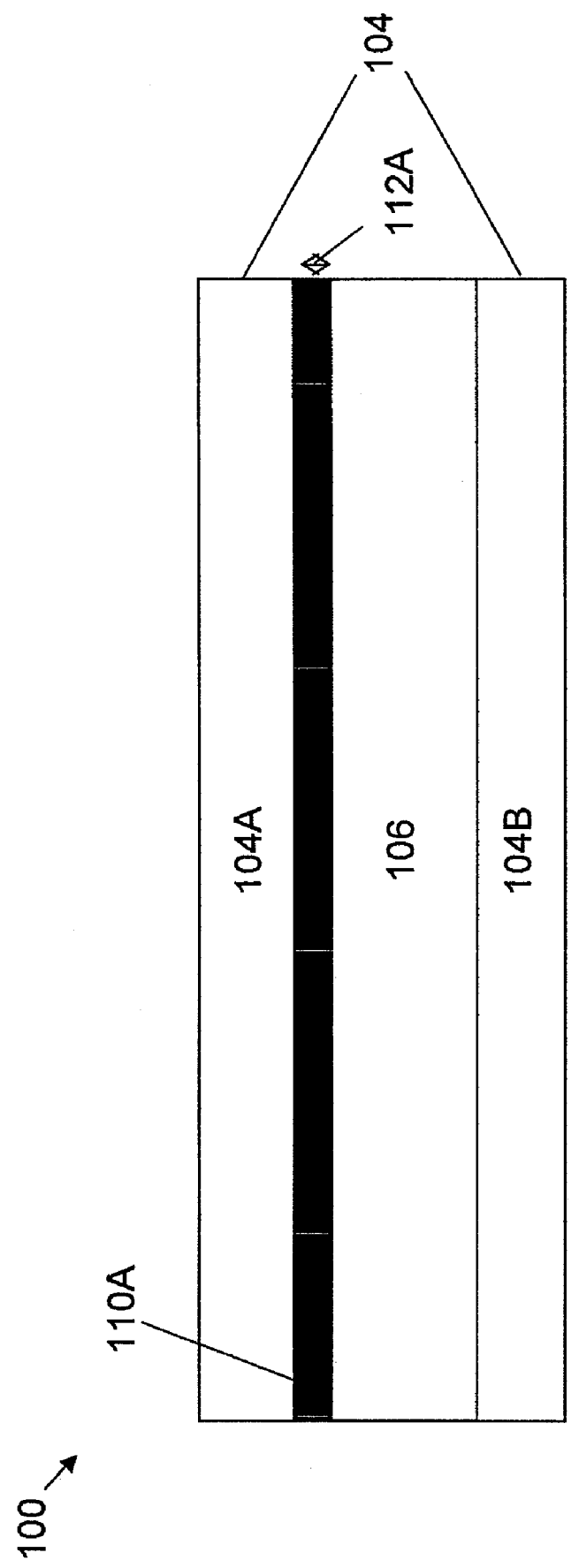
FIG. 1A illustrates an embodiment in which one polymer layer is interposed between an electrode layer and a photorefractive material on one side of the photorefractive material.
Figure 1B:
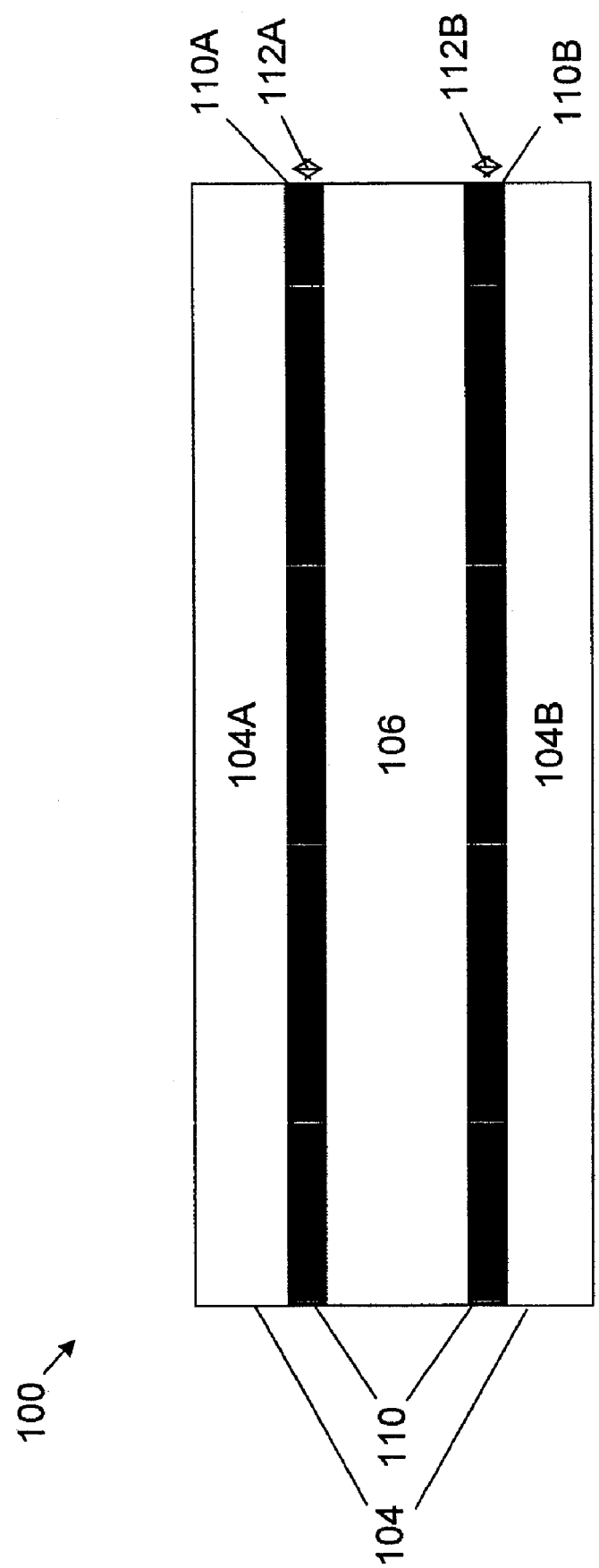
FIG. 1B illustrates an embodiment in which two polymer layers are interposed between an electrode layer and a photorefractive material on both sides of the photorefractive material.

FIGS. 1A-1B illustrate a portion of one embodiment of a photorefractive device 100, comprising one or more electrode layers 104 and a photorefractive material 106. In one embodiment, first and second electrode layers 104A, 104B are positioned adjacent to the sides of the photorefractive material 106. The first and second electrode layers 104A, 104B may comprise the same materials or different materials, as discussed below.

The photorefractive layer can have a variety of thickness values for use in a photorefractive device. In an embodiment, the photorefractive layer is about 10 to about 200 μm thick. In an embodiment, the photorefractive layer is about 25 to about 100 μm thick. Such ranges of thickness allow for the photorefractive material to give good grating behavior.

One or more polymer layers 110 are also interposed between the electrode layers 104A, 104B and the photorefractive material 106. In one embodiment, illustrated in FIG. 1A, a first polymer layer 110A is interposed between the first electrode layer 104A and the photorefractive material 106. In an alternative embodiment, illustrated in FIG. 1B, the embodiment of FIG. 1A is modified such that a second polymer layer 110B is interposed between the second electrode layer 104B and the photorefractive material 106. The first and second polymer layers 110A, 110B may comprise the same material or different materials, as discussed below. The thicknesses of each of the polymer layers can be independently selected.

In one embodiment, the polymer layers 110 are applied to the one or more electrode layers 104 by techniques known to those skilled in the art, including, but not limited to, spin coating and solvent casting. The photorefractive material 106 is subsequently mounted to the polymer layer modified electrodes 104.

In one embodiment, the one or more polymer layers 110 comprise a single layer having selected thicknesses 112A, 112B. In an alternative embodiment, the polymer layer 110 comprises more than one layer, where the total thickness 112A, 112B of all the layers of the polymer layer 110 is approximately equal to the selected thickness 112A, 112B. The selected thicknesses 112A, 112B may be independently selected, as necessary. In an embodiment, the selected thicknesses 112A, 112B of the polymer layers 110 range from about 2 μm to 40 μm. In an embodiment, the selected thicknesses 112A, 112B of the polymer layers 110 range from about 2 μm to about 30 μm. In an embodiment, the selected thicknesses 112 range from about 2 μm to about 20 μm. In an embodiment, the selected thicknesses 112 range from about 20 μm to about 40 μm. In one non-limiting example, the selected thicknesses 112A, 112B of the polymer layers 110 are each approximately 20 μm.

In one embodiment, the polymer layer 110 further comprises a polymer exhibiting a low dielectric constant. Preferably, the relative dielectric constant of the polymer layer 110 ranges from about 2 to about 15, and more preferably ranges from about 2 to about 4.5. The refractive index of the polymer layers 110 can be from about 1.5 to about 1.7. Non-limiting examples of materials comprising the polymer layers 110 may include, but are not limited to, polymethyl methacrylate (PMMA), polyimide, amorphous polycarbonate (APC), and siloxane sol-gel. These materials can be used singly or in combination. For example, the one or more polymer layers 110 can comprise any single polymer, a mixture of two or more polymers, multiple layers that each comprise a different polymer, or combinations thereof.

In one embodiment, the electrode 104 comprises a transparent electrode 104. The transparent electrode 104 is further configured as a conducting film. The material comprising the conducting film may be independently selected from the group consisting of metal oxides, metals, and organic films with an optical density less than about 0.2. Non-limiting examples of transparent electrodes 104 include indium tin oxide (ITO), tin oxide, zinc oxide, polythiophene, gold, aluminum, polyaniline, and combinations thereof. Preferably, the transparent electrodes 104 are independently selected from the list consisting of indium tin oxide and zinc oxide.

In one embodiment, the photorefractive composition comprises an organic or inorganic polymer exhibiting photorefractive behavior. In an embodiment, the polymer possesses a refractive index of approximately 1.7. Preferred non-limiting examples include photorefractive compositions comprising a polymer matrix with at least one of a repeat unit including a moiety having photoconductive or charge transport ability and a repeat unit including a moiety having non-linear optical ability, as discussed in greater detail below. Optionally, the composition may further comprise other components, such as repeat units including another moiety having non-linear optical ability, as well as sensitizers and plasticizers, as described in U.S. Pat. No. 6,610,809 to Nitto Denko Corporation and hereby incorporated by reference. One or both of the photoconductive and non-linear optical components are incorporated as functional groups into the polymer structure, typically as side groups.

The group that provides the charge transport functionality may be any group known in the art to provide such capability. If this group is to be attached to the polymer matrix as a side chain, then the group should be capable of incorporation into a monomer that can be polymerized to form the polymer matrix of the photorefractive composition.

Figure 2A:
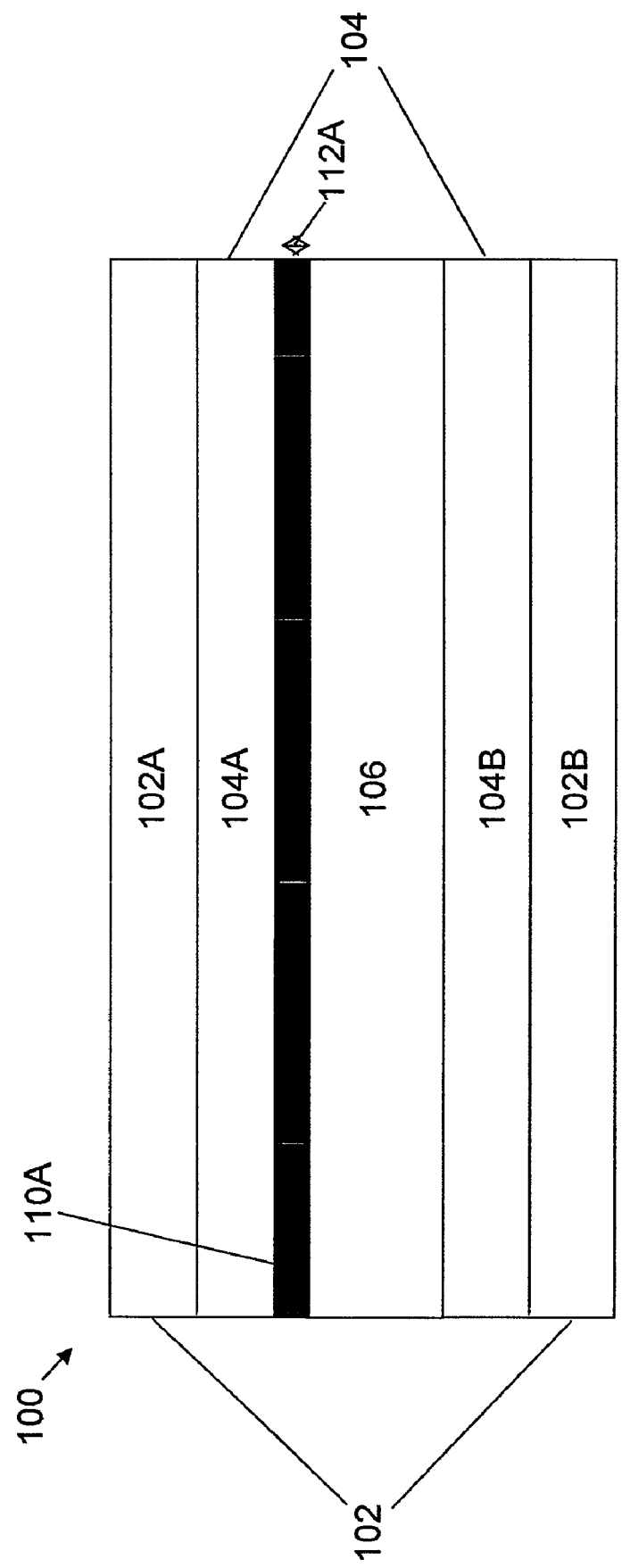
FIG. 2A illustrates an embodiment in which one polymer layer is interposed between an electrode layer and a photorefractive material on one side of the photorefractive material.
Figure 2B:
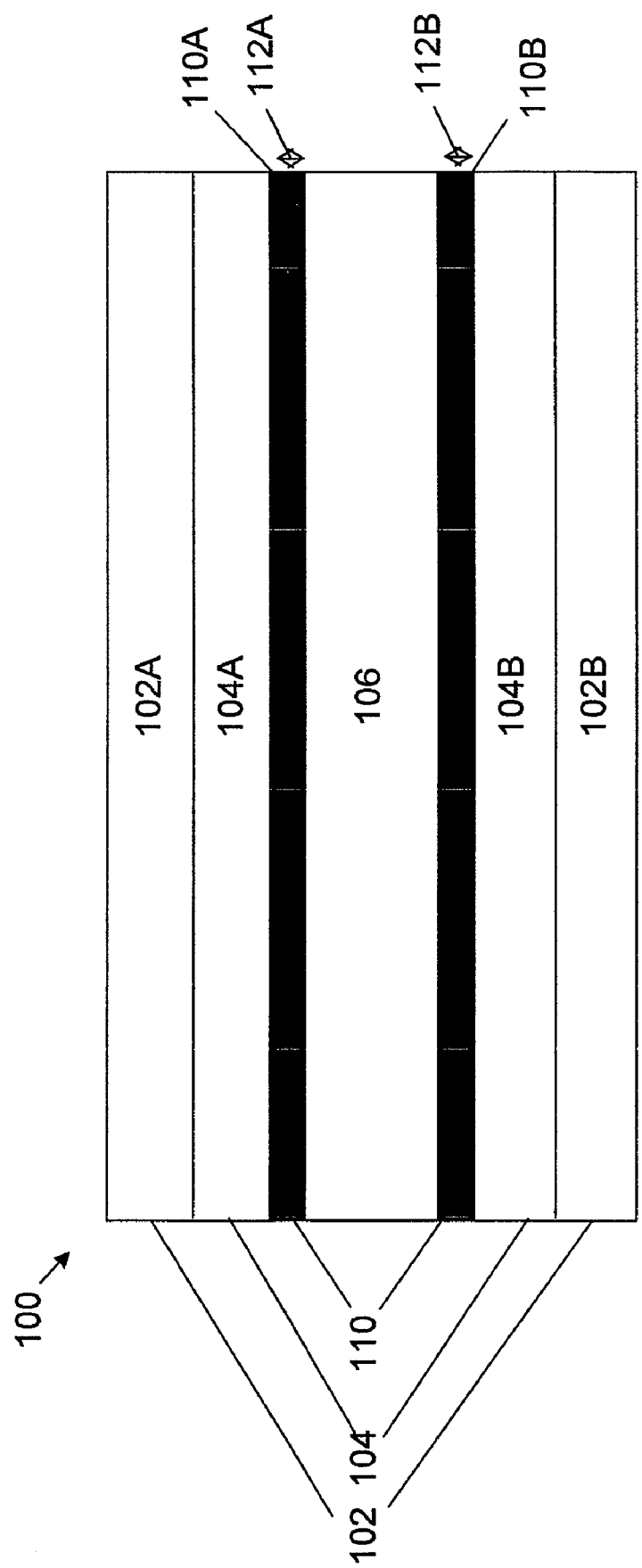
FIG. 2B illustrates an embodiment in which two polymer layers are interposed between an electrode layer and a photorefractive material on both sides of the photorefractive material.

One embodiment of the photorefractive device 100 is illustrated in FIG. 2A-2B. The photorefractive device 100 comprises a plurality of substrate layers 102, a plurality of electrode layers 104 interposed between the substrate layers 102, a plurality of polymer layers 110 interposed between the electrode layers 104, and a photorefractive layer 106 interposed between the polymer layers 110.

In one embodiment, a pair of electrode layers 104A, 104B is interposed between a pair of substrate layers 102A, 102B, and the layer of photorefractive material 106 is interposed between the pair of electrode layers 104A, 104B. In an embodiment, illustrated in FIG. 2A, a first polymer layer 110A is positioned between the first electrode layer 104A and the photorefractive material 106. In an alternative embodiment, illustrated in FIG. 2B, the embodiment of FIG. 2A is modified such that a second polymer layer 110B is interposed between the second electrode layer 104B and the photorefractive material 106. As discussed above, the first and second polymer layers 110A, 110B can comprise the same material or different materials.

Non-limiting examples of the substrate layers 102 include soda lime glass, silica glass, borosilicate glass, gallium nitride, gallium arsenide, sapphire, quartz glass, polyethylene terephthalate, and polycarbonate. Preferably the substrate 102 comprises a material with a refractive index of 1.5 or less.

Non-limiting examples of the photoconductive, or charge transport, groups are illustrated below. In one embodiment, the photoconductive groups comprise phenyl amine derivatives, such as carbazoles and di- and tri-phenyl diamines. In a preferred embodiment, the moiety that provides the photoconductive functionality is chosen from the group of phenyl amine derivates consisting of the following side chain Structures (i), (ii) and (iii):

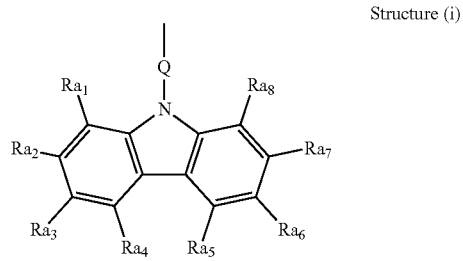

Structure (i)

wherein Q represents an alkylene group, with or without a hetero atom and $Ra_1$-$Ra_8$ are each independently selected from the group consisting of a hydrogen atom, a linear alkyl group with up to 10 carbons, a branched alkyl group with up to 10 carbons, and an aromatic group with up to 10 carbons;

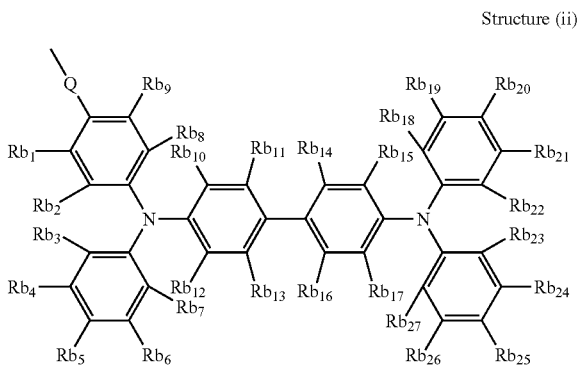

Structure (ii)

wherein Q represents an alkylene group, with or without a hetero atom and $Rb_1$-$Rb_{27}$ are each independently selected from the group consisting of a hydrogen atom, a linear alkyl group with up to 10 carbons, a branched alkyl group with up to 10 carbons, and an aromatic group with up to 10 carbons;

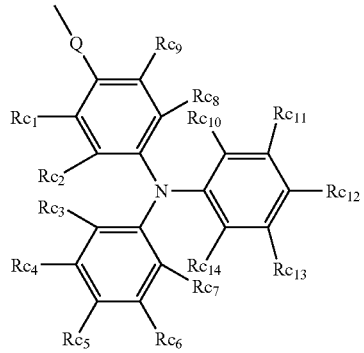

Structure (iii)

wherein Q represents an alkylene group, with or without a hetero atom and $Rc_1$-$Rc_{14}$ are each independently selected from the group consisting of a hydrogen atom, a linear alkyl group with up to 10 carbons, a branched alkyl group with up to 10 carbons, and an aromatic group with up to 10 carbons.

The chromophore, or group that provides the non-linear optical functionality may be any group known in the art to provide such capability. If this group is to be attached to the polymer matrix as a side chain, then the group, or a precursor of the group, should be capable of incorporation into a monomer that can be polymerized to form the polymer matrix of the composition.

The chromophore of the present disclosure is represented by Structure (0):

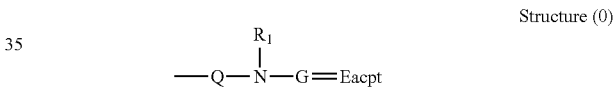

Structure (0)

wherein Q represents an alkylene group, with or without a hetero atom such as oxygen or sulfur and preferably Q is an alkylene group represented by $(CH_2)_p$ where p is between about 2 and 6. $R_1$ is selected from the group consisting of a hydrogen atom, a linear alkyl group with up to 10 carbons, a branched alkyl group with up to 10 carbons, and an aromatic group with up to 10 carbons and preferably $R_1$ is an alkyl group selected from methyl, ethyl, propyl, butyl, pentyl and hexyl. G is a group having a bridge of π-conjugated bond. Eacpt is an electron acceptor group. Preferably Q is selected from the group consisting of ethylene, propylene, butylene, pentylene, hexylene, and heptylene.

In this context, the term "a bridge of π-conjugated bond" refers to a molecular fragment that connects two or more chemical groups by π-conjugated bond. A π-conjugated bond contains covalent bonds between atoms that have σ bonds and π bonds formed between two atoms by overlap of their atomic orbits (s+p hybrid atomic orbits for σ bonds; p atomic orbits for π bonds).

The term "electron acceptor" refers to a group of atoms with a high electron affinity that can be bonded to a π-conjugated bridge. Exemplary acceptors, in order of increasing strength, are: $C(O)NR^2 < C(O)NHR < C(O)NH_2 < C(O)OR < C(O)OH < C(O)R < C(O)H < CN < S(O)_2R < NO_2$, wherein R and $R_2$ are each independently selected from the group consisting of a hydrogen atom, a linear alkyl group with up to 10 carbons, a branched alkyl group with up to 10 carbons, and an aromatic group with up to 10 carbons As typical exemplary electron acceptor groups, functional groups which are described in U.S. Pat. No. 6,267,913, hereby incorporated by reference, can be used. At least a portion of these electron acceptor groups are shown in the structures below. The symbol "‡" in the chemical structures below specifies an atom of attachment to another chemical group and indicates that the structure is missing a hydrogen that would normally be implied by the structure in the absence of the "‡":

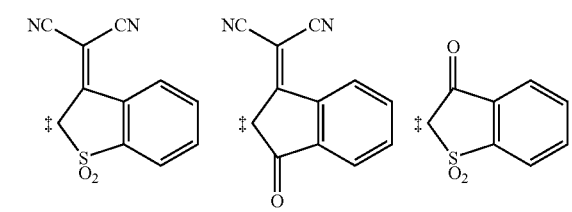

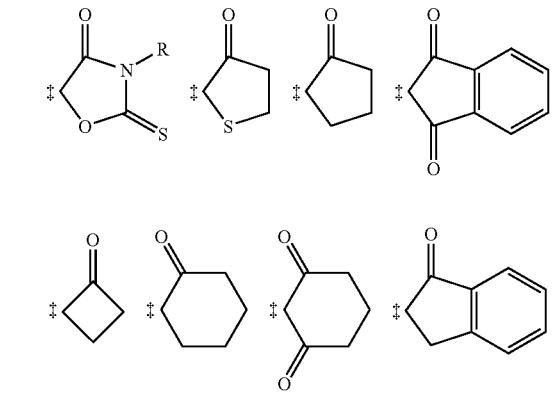

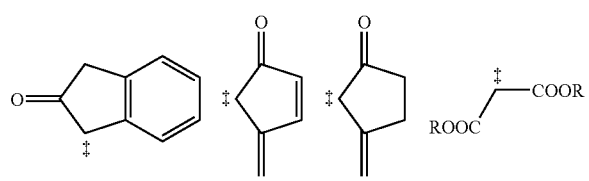

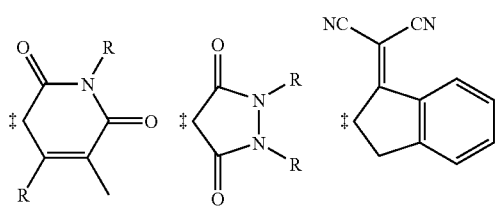

-continued

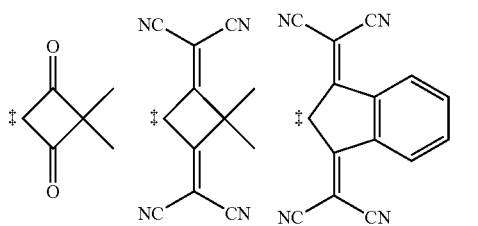

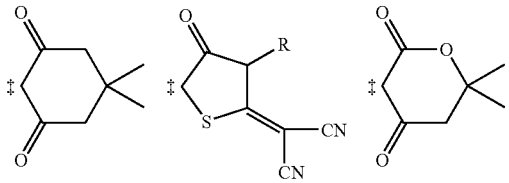

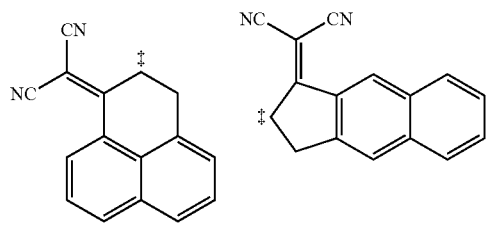

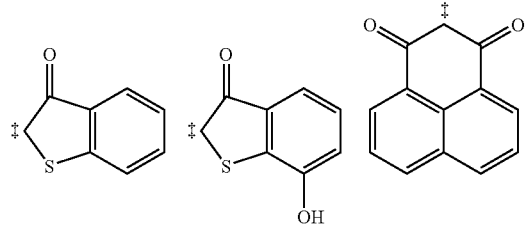

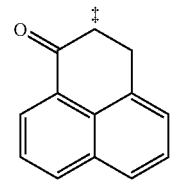

wherein R is selected from the group consisting of a hydrogen atom, a linear alkyl group with up to 10 carbons, a branched alkyl group with up to 10 carbons, and an aromatic group with up to 10 carbons.

Preferred chromophore groups are aniline-type groups or dehydronaphtyl amine groups.

Most preferably, the moiety that provides the non-linear optical functionality is such a case that G in Structure (0) is represented by a structure selected from the group consisting of the Structures (iv) and (v):

Structure (iv)

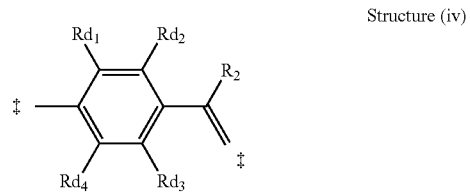

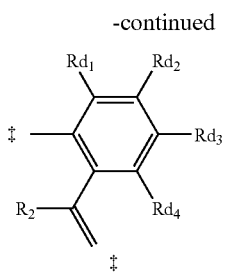
Structure (v)

wherein, in both structures (iv) and (v), $Rd_1$-$Rd_4$ are each independently selected from the group consisting of a hydrogen atom, a linear alkyl group with up to 10 carbons, a branched alkyl group with up to 10 carbons, and an aromatic group with up to 10 carbons, and preferably $Rd_1$-$Rd_4$ are all hydrogen. $R_2$ is selected from the group consisting of a hydrogen atom, a linear alkyl group with up to 10 carbons, a branched alkyl group with up to 10 carbons, and an aromatic group with up to 10 carbons.

In an embodiment, Eacpt in Structure (0) is an electron acceptor group represented by a structure selected from the group consisting of the structures:

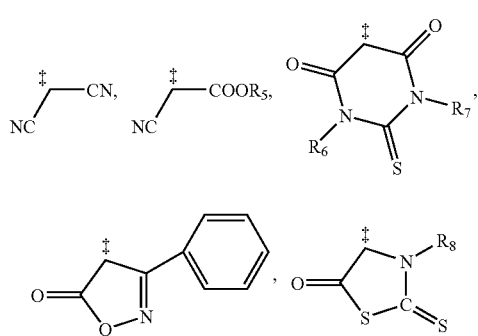

wherein $R_5$, $R_6$, $R_7$ and $R_8$ are each independently selected from the group consisting of a hydrogen atom, a linear alkyl group with up to 10 carbons, a branched alkyl group with up to 10 carbons, and an aromatic group with up to 10 carbons.

In one embodiment, material backbones, including, but not limited to, polyurethane, epoxy polymers, polystyrene, polyether, polyester, polyamide, polyimide, polysiloxane, and polyacrylate with the appropriate side chains attached, may be used to make the material matrices of the present disclosure.

Preferred types of backbone units are those based on acrylates or styrene. Particularly preferred are acrylate-based monomers, and more preferred are methacrylate monomers. The first polymeric materials to include photoconductive functionality in the polymer itself were the polyvinyl carbazole materials developed at the University of Arizona. However, these polyvinyl carbazole polymers tend to become viscous and sticky when subjected to the heat-processing methods typically used to form the polymer into films or other shapes for use in photorefractive devices.

In contrast, (meth)acrylate-based, and more specifically acrylate-based, polymers, have much better thermal and mechanical properties. That is, they provide better workability during processing by injection-molding or extrusion, for example. This is particularly true when the polymers are prepared by radical polymerization.

The photorefractive polymer composition, in an embodiment, is synthesized from a monomer incorporating at least one of the above photoconductive groups or one of the above chromophore groups. It is recognized that a number of physical and chemical properties are also desirable in the polymer matrix. It is preferred that the polymer incorporates both a charge transport group and a chromophore group, so the ability of monomer units to form copolymers is preferred. Physical properties of the formed copolymer that are of importance include, but are not limited to, the molecular weight and the glass transition temperature, $T_g$. Also, it is valuable and desirable, although optional, that the composition should be capable of being formed into films, coatings and shaped bodies of various kinds by standard polymer processing techniques, such as solvent coating, injection molding, and extrusion.

In the present invention, the polymer generally has a weight average molecular weight, $M_w$, of from about 3,000 to 500,000, preferably from about 5,000 to 100,000. The term "weight average molecular weight" as used herein means the value determined by the GPC (gel permeation chromatography) method in polystyrene standards, as is well known in the art.

In a non-limiting example, the polymer composition used in the photorefractive material comprises a repeating unit selected from the group consisting of the Structures (i)", (ii)", and (iii)" which provides charge transport functionality:

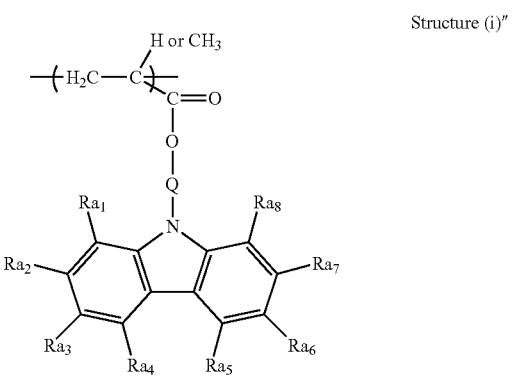
Structure (i)"

wherein Q represents an alkylene group, with or without a hetero atom and $Ra_1$-$Ra_8$ are each independently selected from the group consisting of a hydrogen atom, a linear alkyl group with up to 10 carbons, a branched alkyl group with up to 10 carbons, and an aromatic group with up to 10 carbons;

Structure (ii)″

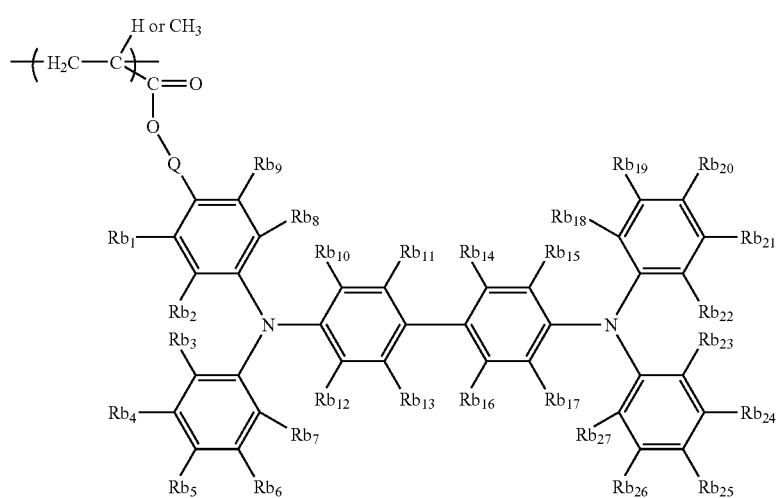

wherein Q represents an alkylene group, with or without a hetero atom and $Rb_1$-$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)″

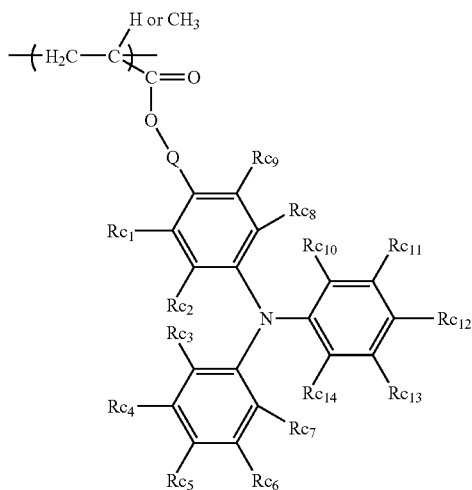

wherein Q represents an alkylene group, with or without a hetero atom and $Rc_1$-$Rc_{14}$ are each independently selected from the group consisting of a hydrogen atom, a linear alkyl group with up to 10 carbons, a branched alkyl group with up to 10 carbons, and an aromatic group with up to 10 carbons.

In a non-limiting example, the polymer composition used in the photorefractive material comprises a repeating unit represented by the Structure (0)″ which provides non-linear optical functionality:

Structure (0)″

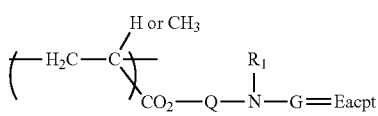

wherein Q represents an alkylene group, with or without a hetero atom such as oxygen or sulfur, and preferably Q is an alkylene group represented by $(CH_2)_p$ where p is between about 2 and 6. $R_1$ is selected from the group consisting of a hydrogen atom, a linear alkyl group with up to 10 carbons, a branched alkyl group with up to 10 carbons, and an aromatic group with up to 10 carbons, and preferably $R_1$ is an alkyl group selected from methyl, ethyl, propyl, butyl, pentyl and hexyl. G is a group having a bridge of π-conjugated bond. Eacpt is an electron acceptor group. Preferably Q is selected from the group consisting of ethylene, propylene, butylene, pentylene, hexylene, and heptylene. G and Eacpt are as described above with respect to Structure (0).

Further non-limiting examples of monomers including a phenyl amine derivative group as the charge transport component include carbazolylpropyl(meth)acrylate monomer; 4-(N,N-diphenylamino)-phenylpropyl(meth)acrylate; N-[(meth)acroyloxypropylphenyl]-N,N',N'-triphenyl-(1,1'-biphenyl)-4,4'-diamine; N-[(meth)acroyloxypropylphenyl]-N'-phenyl-N,N'-di(4-methylphenyl)-(1,1'-biphenyl)-4,4'-diamine; and N-[(meth)acroyloxypropylphenyl]-N'-phenyl-N,N'-di(4-buthoxyphenyl)-(1,1'-biphenyl)-4,4'-diamine. Such monomers can be used singly or in mixtures of two or more monomers.

Further non-limiting examples of monomers including a chromophore group as the non-linear optical component include N-ethyl, N-4-dicyanomethylidenyl acrylate and N-ethyl, N-4-dicyanomethylidenyl-3,4,5,6,10-pentahydronaphtylpentyl acrylate.

Diverse polymerization techniques are known in the art to manufacture polymers from the above discussed monomers. One such conventional technique is radical polymerization, which is typically carried out by using an azo-type initiator, such as AIBN (azoisobutyl nitrile). In this radical polymerization method, the polymerization catalysis is generally used in an amount of from about 0.01 to 5 mol %, preferably from about 0.1 to 1 mol %, per mole of the sum of the polymerizable monomers.

In one embodiment of the present disclosure, conventional radical polymerization can be carried out in the presence of a solvent, such as ethyl acetate, tetrahydrofuran, butyl acetate, toluene or xylene. The solvent is generally used in an amount of from about 100 to 10000 wt %, and preferably from about 1000 to 5000 wt %, per weight of the sum of the polymerizable monomers.

In an alternative embodiment, conventional radical polymerization is carried out without a solvent in the presence of an inert gas. In one embodiment, the inactive gas comprises one of nitrogen, argon, and helium. The gas pressure during polymerization ranges from about 1 to 50 atm, and preferably from about 1 to 5 atm.

The conventional radical polymerization is preferably carried out at a temperature of from about 50° C. to 100° C. and is allowed to continue for about 1 to 100 hours, depending on the desired final molecular weight and polymerization temperature and taking into account the polymerization rate.

By carrying out the radical polymerization technique based on the teachings and preferences given above, it is possible to prepare polymers having charge transport groups, polymers having non-linear optical groups, and random or block copolymers carrying both charge transport and non-linear optical groups. Polymer systems may further be prepared from combinations of these polymers. Additionally, by following the techniques described herein, it is possible to prepare such materials with exceptionally good properties, such as photoconductivity, response time, and diffraction efficiency.

If the polymer is made from monomers that provide only charge transport ability, the photorefractive composition of the invention can be made by dispersing a component that possesses non-linear optical properties through the polymer matrix, as is described in U.S. Pat. No. 5,064,264 to IBM, which is incorporated herein by reference. Suitable materials are known in the art and are well described in the literature, such as D. S. Chemla & J. Zyss, "Nonlinear Optical Properties of Organic Molecules and Crystals" (Academic Press, 1987), incorporated herein by reference. Also, as described in U.S. Pat. No. 6,090,332 to Seth R. Marder et. al., hereby incorporated by reference, fused ring bridge, ring locked chromophores that form thermally stable photorefractive compositions can be used. For typical, non-limiting examples of chromophore additives, the following chemical structure compounds can be used:

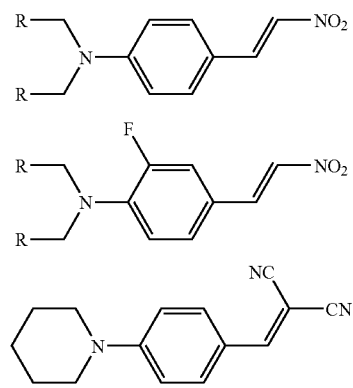

-continued

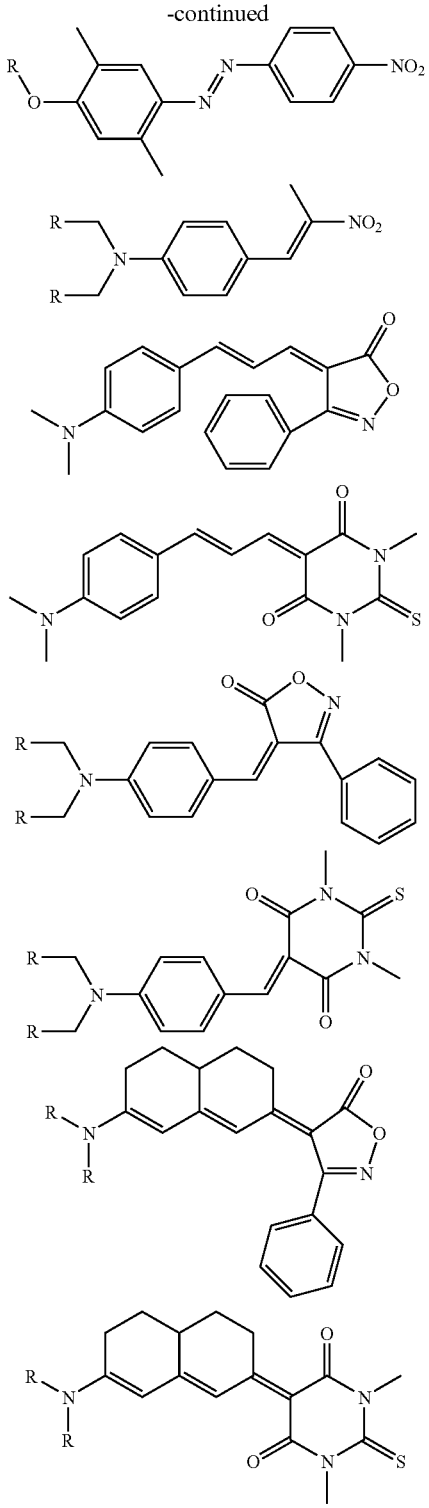

The chosen compound or compounds are may be mixed in the matrix copolymer in a concentration of about up to 80 wt %, more preferably up to about 40 wt %.

On the other hand, if the polymer is made from monomers that provide only the non-linear optical ability, the photorefractive composition can be made by mixing a component that possesses charge transport properties into the polymer matrix, again as is described in U.S. Pat. No. 5,064,264 to IBM. Preferred charge transport compounds are good hole transfer compounds, for example, N-alkyl carbazole or triphenylamine derivatives.

As an alternative, or in addition to, adding the charge transport component in the form of a dispersion of entities comprising individual molecules with charge transport capability, a polymer blend can be made of individual polymers with charge transport and non-linear optical abilities. For the charge transport polymer, the polymers already described above, such as those containing phenyl-amine derivative side chains, can be used. Since polymers containing only charge transport groups are comparatively easy to prepare by conventional techniques, the charge transport polymer may be made by radical polymerization or by any other convenient method.

To prepare the non-linear optical containing copolymer, monomers that have side-chain groups possessing non-linear-optical ability may be used. Non-limiting examples of monomers that may be used are those containing the following chemical structures:

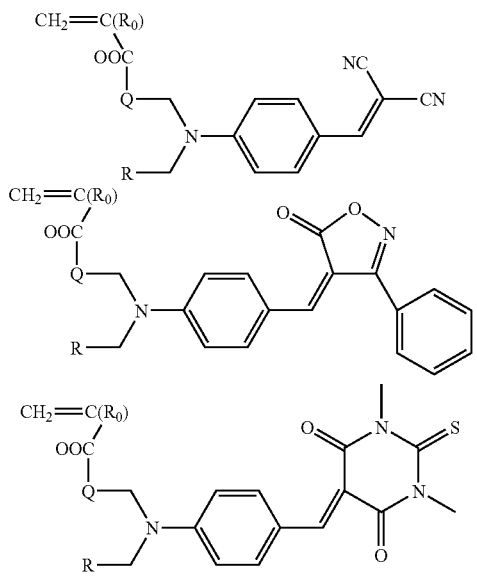

wherein Q represents an alkylene group with or without a hetero atom such as oxygen or sulfur, and preferably Q is an alkylene group represented by $(CH_2)_p$ where p is between about 2 and 6; $R_0$ is a hydrogen atom or methyl group. R is a linear or branched alkyl group with up to 10 carbons. Preferably R is an alkyl group which is selected from methyl, ethyl, or propyl.

A new technique for preparing the copolymers has also been discovered. The technique involves the use of a precursor monomer containing a precursor functional group for non-linear optical ability. Typically, this precursor is represented by the following general Structure (1):

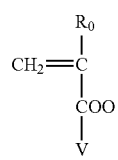

Structure (1)

wherein $R_0$ is a hydrogen atom or methyl group and V is selected from the group consisting of the following structures (vi) and (vii):

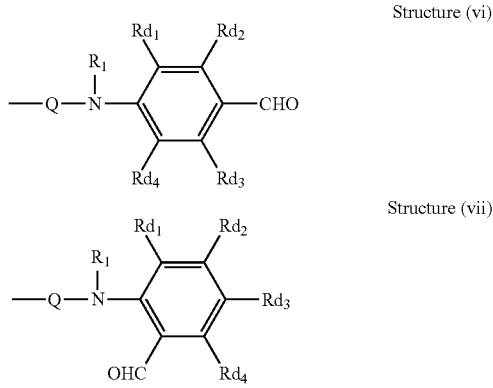

wherein, in both structures (vi) and (vii), Q represents an alkylene group, with or without a hetero atom such as oxygen or sulfur, and preferably Q is an alkylene group represented by $(CH_2)_p$ where p is between about 2 and 6. $Rd_1$-$Rd_4$ are independently selected from the group consisting of a hydrogen atom, a linear alkyl group with up to 10 carbons, a branched alkyl group with up to 10 carbons, and an aromatic group with up to 10 carbons, and preferably $Rd_1$-$Rd_4$ are hydrogen; and wherein $R_1$ represents a linear or branched alkyl group with up to 10 carbons, and preferably $R_1$ is an alkyl group selected from methyl, ethyl, propyl, butyl, pentyl or hexyl.

To prepare copolymers, both the non-linear optical monomer and the charge transport monomer, each of which can be selected from the types mentioned above, may be used. The procedure for performing the radical polymerization in this case involves the use of the same polymerization methods and operating conditions, with the same preferences, as described above.

After the precursor copolymer has been formed, it can be converted into the corresponding copolymer having non-linear optical groups and capabilities by a condensation reaction. Typically, the condensation reagent may be selected from the group consisting of:

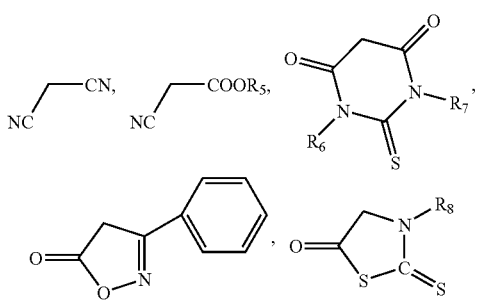

wherein $R_5$, $R_6$, $R_7$ and $R_8$ are each independently selected from the group consisting of a hydrogen atom, a linear alkyl group with up to 10 carbons, a branched alkyl group with up to 10 carbons, and an aromatic group with up to 10 carbons.

The condensation reaction can be done at room temperature for about 1-100 hrs, in the presence of a pyridine derivative catalyst. A solvent, such as butyl acetate, chloroform, dichloromethylene, toluene or xylene can be used. Optionally, the reaction may be carried out without the catalyst at a solvent reflux temperature of about 30° C. or above for about 1 to 100 hours.

It has been discovered that use of a monomer containing a precursor group for non-linear-optical ability, and conversion of that group after polymerization tends to result in a polymer product of lower polydispersity than the case if a monomer containing the non-linear-optical group is used. This is, therefore, one preferred technique for formation of the photorefractive composition.

There are no restrictions on the ratio of monomer units for the copolymers comprising a repeating unit including the first moiety having charge transport ability, a repeating unit including the second moiety having non-linear-optical ability, and, optionally, a repeating unit including the third moiety having plasticizing ability. However, as a typical representative example, the ratio per 100 weight parts of a (meth)acrylic monomer having charge transport ability relative to a (meth)acrylate monomer having non-linear optical ability ranges between about 1 and 200 weight parts and preferably ranges between about 10 and 100 weight parts. If this ratio is less than about 1 weight part, the charge transport ability of copolymer itself is weak and the response time tends to be too slow to give good photorefractivity. However, even in this case, the addition of already described low molecular weight components having non-linear-optical ability can enhance photorefractivity. On the other hand, if this ratio is more than about 200 weight parts, the non-linear-optical ability of copolymer itself is weak, and the diffraction efficiency tends to be too low to give good photorefractivity. However, even in this case, the addition of already described low molecular weight components having charge transport ability can enhance photorefractivity.

Optionally, other components may be added to the polymer matrix to provide or improve the desired physical properties mentioned earlier in this section. Usually, for good photorefractive capability, it is preferred to add a photosensitizer to serve as a charge generator. A wide choice of such photosensitizers is known in the art. Typical, but non-limiting examples of photosensitizers that may be used are 2,4,7-trinitro-9-fluorenone dicyanomalonate (TNFDM), dinitrofluorenone, mononitro-fluorenone, and C60. The amount of photosensitizer required is usually less than about 3 wt %.

The compositions can also be mixed with one or more components that possess plasticizer properties into the polymer matrix to form the photorefractive composition. Any commercial plasticizer compound can be used, such as phthalate derivatives or low molecular weight hole transfer compounds, for example N-alkyl carbazole or triphenylamine derivatives or acetyl carbazole or triphenylamine derivatives. N-alkyl carbazole or triphenylamine derivatives containing electron acceptor group, depicted in the following structures 4, 5, or 6, can help the photorefractive composition more stable, since the plasticizer contains both N-alkyl carbazole or triphenylamine moiety and non-liner optics moiety in one compound.

Non-limiting examples of the plasticizer include ethyl carbazole; 4-(N,N-diphenylamino)-phenylpropyl acetate; 4-(N,N-diphenylamino)-phenylmethyloxy acetate; N-(acetoxypropylphenyl)-N,N',N'-triphenyl-(1,1'-biphenyl)-4,4'-diamine; N-(acetoxypropylphenyl)-N'-phenyl-N,N'-di(4-methylphenyl)-(1,1'-biphenyl)-4,4'-diamine; and N-(acetoxypropylphenyl)-N'-phenyl-N,N'-di(4-buthoxyphenyl)-(1,1'-biphenyl)-4,4'-diamine. Such compounds can be used singly or in mixtures of two or more monomers. Also, un-polymerized monomers can be low molecular weight hole transfer compounds, for example 4-(N,N-diphenylamino)-phenylpropyl(meth)acrylate; N-[(meth)acroyloxypropylphenyl]-N,N',N'-triphenyl-(1,1'-biphenyl)-4,4'-diamine; N-[(meth)acroyloxypropylphenyl]-N'-phenyl-N,N'-di(4-methylphenyl)-(1,1'-biphenyl)-4,4'-diamine; and N-[(meth)acroyloxypropylphenyl]-N'-phenyl-N,N'-di(4-buthoxyphenyl)-(1,1'-biphenyl)-4,4'-diamine. Such monomers can be used singly or in mixtures of two or more monomers.

Preferably, as another type of plasticizer, N-alkyl carbazole or triphenylamine derivatives, which contains electron acceptor group, as depicted in the following Structures 4, 5, or 6, can be used:

Structure 4

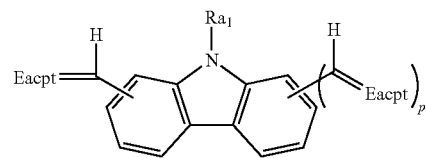

wherein $Ra_1$ is independently selected from the group consisting of a hydrogen atom, a linear alkyl group with up to 10 carbons, a branched alkyl group with up to 10 carbons, and an aromatic group with up to 10 carbons; p is 0 or 1;

Structure 5

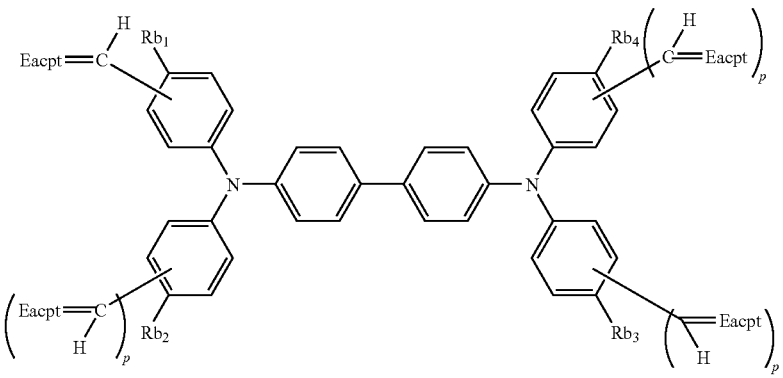

wherein $Rb_1$-$Rb_4$ are each independently selected from the group consisting of a hydrogen atom, a linear alkyl group with up to 10 carbons, a branched alkyl group with up to 10 carbons, and an aromatic group with up to 10 carbons; p is 0 or 1;

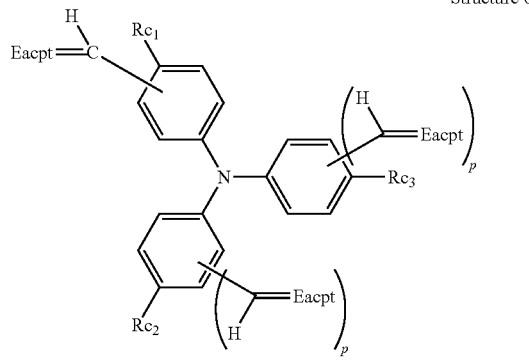

Structure 6 wherein $Rc_1$-$Rc_3$ are each independently selected from the group consisting of a hydrogen atom, a linear alkyl group with up to 10 carbons, a branched alkyl group with up to 10 carbons, and an aromatic group with up to 10 carbons; p is 0 or 1; wherein Eacpt is an electron acceptor group and represented by a structure selected from the group consisting of the structures:

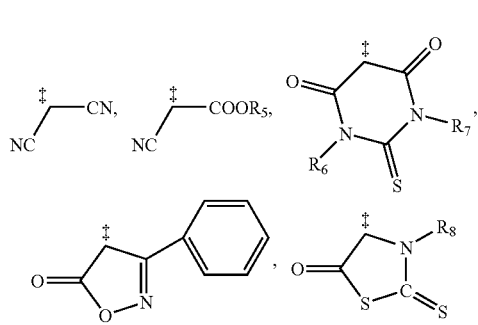

wherein $R_5$, $R_6$, $R_7$ and $R_8$ are each independently selected from the group consisting of a hydrogen atom, a linear alkyl group with up to 10 carbons, a branched alkyl group with up to 10 carbons, and an aromatic group with up to 10 carbons.

Preferred embodiments of the invention provide polymers of comparatively low $T_g$ when compared with similar polymers prepared in accordance with conventional methods. The inventors have recognized that this provides a benefit in terms of lower dependence on plasticizers. By selecting copolymers of intrinsically moderate $T_g$ and by using methods that tend to depress the average $T_g$, it is possible to limit the amount of plasticizer required for the composition to preferably no more than about 30% or 25%, and more preferably lower, such as no more than about 20%.

EXAMPLES

It has been discovered that photorefractive devices produced using the systems and methods disclosed above can achieve an increase in signal efficiency of three to four times that of similar, but non-buffered devices, while using approximately half the biased voltage, which results in longer device lifetime.

These benefits are further described by the following examples, which are intended to be illustrative of the embodiments of the disclosure, but are not intended to limit the scope or underlying principles in any way.

(a) Monomers Containing Charge Transport Groups—TPD Acrylate Monomer

Triphenyl diamine type (N-[acroyloxypropylphenyl]-N, N',N'-triphenyl-(1,1'-biphenyl)-4,4'-diamine) (TPD acrylate) were purchased from Fuji Chemical, Japan. The TPD acrylate type monomers have the structure:

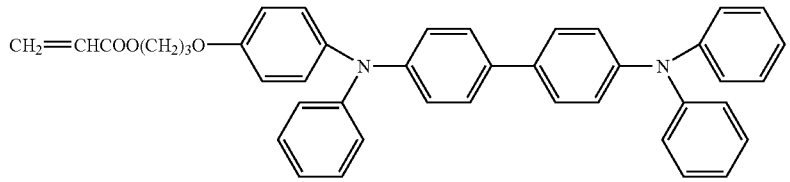

(b) Monomers Containing Non-Linear-Optical Groups

The non-linear-optical precursor monomer 5-[N-ethyl-N-ethyl-N-4-formylphenyl]amino-pentyl acrylate was synthesized according to the following synthesis scheme:

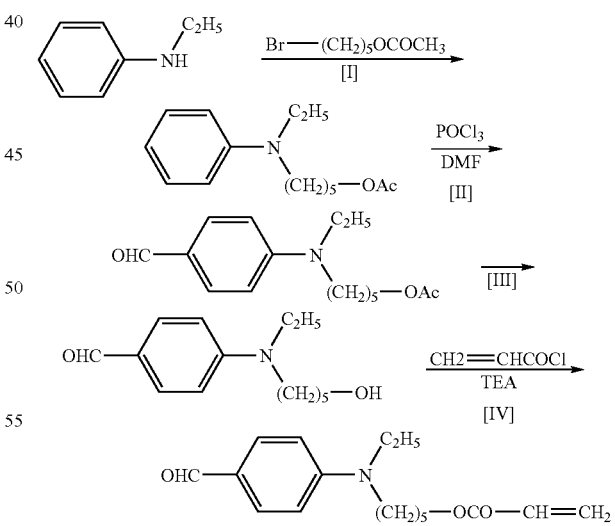

Step I:
Into bromopentyl acetate (about 5 mL or 30 mmol) and toluene (about 25 mL), triethylamine (about 4.2 mL or 30 mmol) and N-ethylaniline (about 4 mL or 30 mmol) were added at about room temperature. This solution was heated to about 120° C. overnight. After cooling down, the reaction mixture was rotary-evaporated. The residue was purified by silica gel chromatography (developing solvent: hexane/acetone=about 9/1). An oily amine compound was obtained. (Yield: about 6.0 g (80%))

Step II:

Anhydrous DMF (about 6 mL or 77.5 mmol) was cooled in an ice-bath. Then, POCl₃ (about 2.3 mL or 24.5 mmol) was added dropwise into a roughly 25 mL flask, and the mixture was allowed to come to room temperature. The amine compound (about 5.8 g or 23.3 mmol) was added through a rubber septum by syringe with dichloroethane. After stirring for about 30 min., this reaction mixture was heated to about 90° C. and the reaction was allowed to proceed overnight under an argon atmosphere.

The next day, the reaction mixture was cooled, and poured into brine water and extracted by ether. The ether layer was washed with potassium carbonate solution and dried over anhydrous magnesium sulfate. After removing the magnesium sulfate, the solvent was removed and the residue was purified by silica gel chromatography (developing solvent: hexane/ethyl acetate=about 3/1). An aldehyde compound was obtained. (Yield: about 4.2 g (65%))

Step III:

The aldehyde compound (about 3.92 g or 14.1 mmol) was dissolved with methanol (about 20 mL). Into this mixture, potassium carbonate (about 400 mg) and water (about 1 mL) were added at room temperature and the solution was stirred overnight. The next day, the solution was poured into brine water and extracted by ether. The ether layer was dried over anhydrous magnesium sulfate. After removing the magnesium sulfate, the solvent was removed and the residue was purified by silica gel chromatography (developing solvent: hexane/acetone=about 1/1). An aldehyde alcohol compound was obtained. (Yield: about 3.2 g (96%))

Step IV:

The aldehyde alcohol (about 5.8 g or 24.7 mmol) was dissolved with anhydrous THF (about 60 mL). Into this mixture, triethylamine (about 3.8 mL or 27.1 mmol) was added and the solution was cooled by ice-bath. Acrolyl chloride (about 2.1 mL or 26.5 mmol) was added and the solution was maintained at about 0° C. for about 20 minutes. Thereafter, the solution was allowed to warm up to room temperature and stirred at room temperature for about 1 hour, at which point TLC indicated that substantially all of the alcohol compound had disappeared. The solution was poured into brine water and extracted by ether. The ether layer was dried over anhydrous magnesium sulfate. After removing the magnesium sulfate, the solvent was removed and the residue acrylate compound was purified by silica gel chromatography (developing solvent: hexane/acetone=about 1/1). The compound yield was about 5.38 g (76%), and the compound purity was about 99% (by GC).

c) Synthesis of Non-Linear-Optical Chromophore 7-FDCST

The non-linear-optical precursor 7-FDCST (7 member ring dicyanostyrene, 4-homopiperidino-2-fluorobenzylidene malononitrile) was synthesized according to the following two-step synthesis scheme:

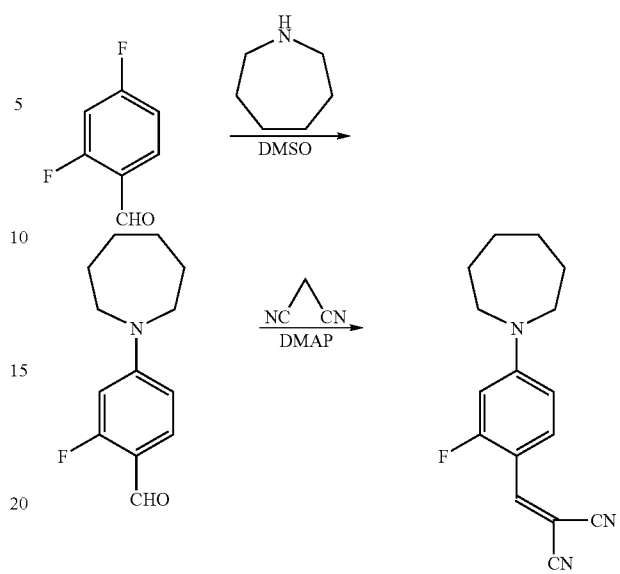

A mixture of 2,4-difluorobenzaldehyde (about 25 g or 176 mmol), homopiperidine (about 17.4 g or 176 mmol), lithium carbonate (about 65 g or 880 mmol), and DMSO (about 625 mL) was stirred at about 50° C. for about 16 hr. Water (about 50 mL) was added to the reaction mixture. The products were extracted with ether (about 100 mL). After removal of ether, the crude products were purified by silica gel column chromatography using hexanes-ethyl acetate (about 9:1) as eluent and crude intermediate was obtained (about 22.6 g). 4-(Dimethylamino)pyridine (about 230 mg) was added to a solution of the 4-homopiperidino-2-fluorobenzaldehyde (about 22.6 g or 102 mmol) and malononitrile (about 10.1 g or 153 mmol) in methanol (about 323 mL). The reaction mixture was kept at room temperature and the product was collected by filtration and purified by recrystallization from ethanol. Yield (about 18.1 g or 38%)

d) Matrix Polymer

Production Example 1

Preparation of Copolymer by AIBN Radical Initiated Polymerization (TPD Acrylate/Chromophore Type 10:1)

The charge transport monomer N-[(meth)acroyloxypropylphenyl]-N,N', N'-triphenyl-(1,1'-biphenyl)-4,4'-diamine (TPD acrylate) (about 43.34 g), and the non-linear-optical precursor monomer 5-[N-ethyl-N-4-formylphenyl]aminopentyl acrylate (about 4.35 g), prepared as described above, were put into a three-necked flask. After toluene (about 400 mL) was added and purged by argon gas for about 1 hour, azoisobutylnitrile (about 118 mg) was added into this solution. Then, the solution was heated to about 65° C., while continuing to purge with argon gas.

After about 18 hrs polymerization, the polymer solution was diluted with toluene. The polymer was precipitated from the solution and added to methanol, then, the resulting polymer precipitate was collected and washed in diethyl ether and methanol. The white polymer powder was collected and dried. The yield of polymer was about 66%.

The weight average and number average molecular weights were measured by gel permeation chromatography, using polystyrene standard. The results were $M_n$=about 10,600, $M_w$=about 17,100, giving a polydispersity of about 1.61.

To form the polymer with non-linear-optical capability, the precipitated precursor polymer (about 5.0 g) was dissolved with chloroform (about 24 mL). Into this solution, dicyanomalonate (about 1.0 g) and dimethylaminopyridine (about 40 mg) were added, and the reaction was allowed to proceed overnight at about 40° C. As before, the polymer was recovered from the solution by filtration of impurities, followed by precipitation into methanol, washing and drying.

e) Fabrication of Polymer Layer Modified ITO Glass

About 2 g of polymer (APC, PMMA, Sol-gel or polyimide) powder was dissolved in about 20 ml dichloromethane. The solution was stirred under ambient condition overnight to ensure substantially total dissolution. The solution was then filtered through an approximately 0.2 µm PTFE filter and spin-coated onto ITO glass substrate. The film was then pre-baked at about 80° C. for about 60 s and followed by vacuum baking at about 80° C. overnight. The resulted polymer layer thickness range was from 0.5~50 µm, depending on the initial spin-coating speed and polymer concentration, along with coating method.

Example 1

Preparation of Photorefractive Devices

A photorefractive composition testing sample was prepared comprising two ITO-coated glass electrodes, two polymer layers, and a photorefractive layer. The components of the photorefractive composition were approximately as follows:

| | |
|---|---|
| (i) Matrix polymer (described in Production Example 1): | 50.0 wt % |
| (ii) Prepared chromophore of 7FDCST | 30.0 wt % |
| (iii) Ethyl carbazole plasticizer | 20.0 wt % |

To prepare the photorefractive composition, the components listed above were dissolved with toluene and stirred overnight at room temperature. After removing the solvent by rotary evaporator and vacuum pump, the residue was scratched and gathered.

This powdery residue mixture, which is used to form the photorefractive layer, was put on a slide glass and melted at about 125° C. to make an approximately 200-300 µm thickness film, or pre-cake. A first electrode layer and a second electrode layer are positioned adjacent opposite sides of the photorefractive material, with a first polymer layer interposed between the first electrode layer and the photorefractive material, and a second polymer layer interposed between the second electrode layer and the photorefractive material. Each polymer layer used in Example 1 is APC (amorphous polycarbonate) polymer, which was dissolved with dichloromethane into an approximately 5% solution. This polymer solution was coated on the top of ITO covered glass-plate (e.g. electrode layer) with spin-coating machine and dried in an oven (80° C. for 10 min) to provide an approximately 2 µm thick APC layer onto each electrode layer. The APC polymer overlaid the indium tin oxide on each layer.

Then, small portions of the pre-cake photorefractive layer were taken off the slide glass and sandwiched between two APC coated indium tin oxide (ITO) glass plates separated by an approximately 104 µm spacer to form the individual samples. Thus, the photorefractive material had two layers of polymer (APC) on opposite sides thereof with the two electrode layers on the opposite sides of each the polymer layers. Each of the polycarbonate layers had a thickness of approximately 2 microns, for a total polymer thickness of approximately 4 microns in the photorefractive device. The photorefractive composition layer had a thickness of approximately 104 µm.

Measurement Method:

The diffraction efficiency was measured as a function of the applied field, by four-wave mixing experiments at about 532 nm with two s-polarized writing beams and a p-polarized probe beam. The angle between the bisector of the two writing beams and the sample normal was about 60 degrees and the angle between the writing beams was adjusted to provide an approximately 2.5 µm grating spacing in the material (about 20 degrees). The writing beams had approximately equal optical powers of about 0.45 mW/cm², leading to a total optical power of about 1.5 mW on the polymer, after correction for reflection losses. The beams were collimated to a spot size of approximately 500 µm. The optical power of the probe was about 100 µW.

The measurement of diffraction efficiency peak bias was done as follows: The electric field (V/µm) applied to the photorefractive sample was varied from about 0V/µm all the way up to about 100V/µm with certain time period (typically about 30 s), and the sample was illuminated with the two writing beams and the probe beam during this time period. Then, the diffracted beam was recorded. According to the theory, $$\eta \sim \sin^2\left(k \frac{E_o E_o^G}{\sqrt{1 + (E_o^G/E_q)^2}}\right)$$

wherein $E_o^G$ is the component of $E_0$ along the direction of the grating wave-vector and $E_q$ is the trap limited saturation space-charge field. The diffraction efficiency will show maximum peak value at certain applied bias. The peak diffraction efficiency bias thus is a very useful parameter to determine the device performance.

The relative dielectric constant of a material under given conditions is a measure of the extent to which it concentrates electrostatic lines of flux. It is the ratio of the amount of stored electrical energy when a potential is applied, relative to the permittivity of a vacuum. It is also called relative permittivity.

The dielectric constant is represented as $\in_r$ or sometimes κ or K. It is defined as:

$$\varepsilon_r = \frac{\varepsilon_s}{\varepsilon_0}$$

wherein $\in_s$ is the static permittivity of the material and $\in_0$ is vacuum permittivity. Vacuum permittivity is derived from Maxwell's equations by relating the electric field intensity E to the electric flux density D. In vacuum (free space), the permittivity $\in$ is given by $\in_0$, so the dielectric constant is 1.

The relative dielectric constant $\in_r$ can be measured for static electric fields as follows: first the of a test capacitor $C_0$ is measured with vacuum between its plates. Then, using the same capacitor and distance between its plates the capacitance $C_x$ with a dielectric between the plates is measured. The relative dielectric constant can be then calculated as:

$$\varepsilon_r = \frac{C_x}{C_0}$$

For time-varying electromagnetic fields, the dielectric constant of materials becomes frequency dependent and in general is called permittivity.

Grating Persistency

Grating persistency was determined by first writing a photorefractive grating in to the photorefractive device until the signal reaches a steady-state. After that the two writing beams were blocked, the remaining grating was monitored under one of the following three methods: (a) applied bias voltage on and reading beam on continuously; (b) applied bias voltage on and reading beam open periodically; or (c) applied bias voltage off and reading beam open periodically with applied bias voltage on at the same time the reading beam is opened. Some applications, including holographic data storage, such as updatable 3D holographic display, require long grating persistency for better performance. The photorefractive devices including one or more polymer layers described herein provide long grating persistency and improved performance.

Example 2

A photorefractive device was obtained in the same manner as in Example 1 except that the polymer layers were made from PMMA (polymethyl methacrylate). The grating persistency is measured by method (a) with applied bias on and reading beam on continuously.

Example 3

A photorefractive device was obtained in the same manner as in Example 1 except that the polymer layers were made from polyimide. The grating persistency is measured by method (a) with applied bias on and reading beam on continuously.

Example 4

A photorefractive device was obtained in the same manner as in Example 1 except that each of the polymer layer thicknesses was approximately 10 μm, thus giving a combined thickness of the polymer layers of approximately 20 μm. The grating persistency is measured by method (a) with applied bias on and reading beam on continuously.

Example 5

A photorefractive device was obtained in the same manner as in Example 1 except that each of the polymer layer thicknesses was approximately 20 μm, thus giving a combined thickness of the polymer layers of approximately 40 μm. The grating persistency is measured by method (a) with applied bias on and reading beam on continuously.

Example 6

A photorefractive device was obtained in the same manner as in Example 5. The grating persistency is measured by method (b) with applied bias on and reading beam open periodically.

Example 7

A photorefractive device was obtained in the same manner as in Example 5. The grating persistency is measured by method (c) with applied bias off and reading beam open periodically with applied bias on at the same time.

Comparative Example 1

A photorefractive device was obtained in the same manner as in the Example 1 except that it was fabricated without either polymer layer, such that the photorefractive composition was adjacent two electrodes comprising bare ITO glass.

The performances of each device is summarized as follows in Table 1.

TABLE 1

Photorefractive device performance as a function of polymer layer

| | Matrix Polymer | FDCST | ECZ | Polymer layer between ITO and photorefractive composition | Relative dielectric constant of polymer in polymer layer | Peak diffraction efficiency bias (V/μm) |
|---|---|---|---|---|---|---|
| Example | | | | | | |
| 1 | 50 | 30 | 20 | 2 μm APC | 3.2 | 40 |
| 2 | 50 | 30 | 20 | 2 μm PMMA | 3.3 | 45 |
| 3 | 50 | 30 | 20 | 2 μm Polyimide | 3.4 | 47 |
| 4 | 50 | 30 | 20 | 10 μm APC | 3.2 | 40 |
| 5 | 50 | 30 | 20 | 20 μm APC | 3.2 | 50 |
| Comparative example 1 | 50 | 30 | 20 | n/a | n/a | 80 |

As illustrated by the comparative example data, which is described in the prior art, the peak diffraction efficiency bias can be reduced from about 80V/um in the non-polymer layer incorporated devices to between about 40 V/um to 50 V/um for a 532 nm laser beam through the use of the polymer layers. Additionally, it is also observed that amongst the polymers investigated, polymer layers comprising APC exhibited the greatest reduction in peak diffraction efficiency bias.

TABLE 2

Grating persistency of photorefractive device

| Example | Individual polymer layer thickness | Combined thickness of polymer layers | Grating holding measurement method | Grating persistency (time of grating drop to 1/e of the initial value) |
|---|---|---|---|---|
| 1 | 2 μm APC | 4 μm | (a) applied bias on, reading beam on continuously | 10 seconds |
| 2 | 2 μm PMMA | 4 μm | (a) applied bias on, reading beam on continuously | 11 seconds |
| 3 | 2 μm Polyimide | 4 μm | (a) applied bias on, reading beam on continuously | 9 seconds |
| 4 | 10 μm APC | 20 μm | (a) applied bias on, reading beam on continuously | 300 seconds |
| 5 | 20 μm APC | 40 μm | (a) applied bias on, reading beam on continuously | 40 minutes |
| 6 | 20 μm APC | 40 μm | (b) applied bias on, reading beam open periodically | 85 minutes |
| 7 | 20 μm APC | 40 μm | (c) applied bias off, reading beam open periodically with applied bias on at the same time. | 90% grating remaining after 60 hours storage |
| Comparative example 1 | n/a | n/a | (a) applied bias on, reading beam on continuously | 250 ms |
| Comparative example 1 | n/a | n/a | (c) applied bias off, reading beam open periodically with applied bias on at the same time. | <1 s |

As illustrated in Table 2, grating persistency is greatly increased using one or more polymer layers in the photorefractive device. In Example 7, 90% of the grating remained after 60 hours of storage, whereas the grating persistency is less than 1 second in photorefractive devices that do not incorporate a polymer layer.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims. All patents, patent publications and other documents referred to herein are hereby incorporated by reference in their entirety.

What is claimed is:

1. A method for improving the performance of a photorefractive device which contains at least one transparent electrode layer and a photorefractive material, the method comprising interposing one or more polymer layers between the transparent electrode layer and the photorefractive material, wherein the total combined thickness of the one or more polymer layers is from about 2 μm to about 40 μm;
   wherein the peak diffraction efficiency bias of the photorefractive device after incorporating the one or more polymer layers is reduced when measured by using an approximately 532 nm laser beam, relative to a photorefractive device containing at least one transparent electrode layer and a photorefractive material without a polymer layer interposed there between.

2. The method of claim 1, wherein the device comprises:
   a first electrode layer and a second electrode layer positioned adjacent opposite sides of the photorefractive material;
   a first polymer layer interposed between the first electrode layer and the photorefractive material; and
   a second polymer layer interposed between the second electrode layer and the photorefractive material.

3. The method of claim 1, wherein the one or more polymer layers are formed from a substance selected from the group consisting of polymethyl methacrylate, polyimide, amorphous polycarbonate, siloxane sol-gel, and combinations thereof.

4. The method of claim 1, wherein the total combined thickness of the one or more polymer layers is from about 2 μm to about 30 μm.

5. The method of claim 1, wherein the refractive index of the one or more polymer layers ranges from about 1.5 to about 1.7.

6. The method of claim 1, wherein the electrode comprises conducting films independently selected from the group consisting of metal oxides, metals, and organic films, with an optical density less than about 0.2.

7. The method of claim 1, wherein the photorefractive material comprises organic or inorganic polymers exhibiting photorefractive behavior and possessing a refractive index of about 1.7.

8. A photorefractive device, comprising:
   a photorefractive material;
   a first electrode layer and a second electrode layer; and
   at least one polymer layer interposed between the first electrode layer and the photorefractive material, wherein the total combined thickness of the one or more polymer layers is from about 2 μm to about 40 μm;

wherein the peak diffraction efficiency bias of the photorefractive device containing the polymer layer is reduced compared to a photorefractive device without a polymer layer when measured by an approximately 532 nm laser beam.

9. The device of claim 8, comprising a first polymer layer and a second polymer layer, wherein:
- the first electrode layer and the second electrode layer are positioned adjacent opposite sides of the photorefractive material;
- the first polymer layer is interposed between the first electrode layer and the photorefractive material; and
- the second polymer layer is interposed between the second electrode layer and the photorefractive material.

10. The device of claim 8, wherein the grating persistency of the photorefractive device is 1 minute or more when measured by an approximately 532 nm laser beam.

11. The device of claim 8, wherein the grating persistency of the photorefractive device is 1 hour or more when measured by an approximately 532 nm laser beam.

12. The device of claim 8, wherein the at least one polymer layer is formed from a substance selected from the group consisting of polymethyl methacrylate, polyimide, amorphous polycarbonate, siloxane sol-gel, and combinations thereof.

13. The device of claim 8, wherein the refractive index of the at least one polymer layer is from about 1.5 to about 1.7.

14. The device of claim 8, wherein the total combined thickness of the at least one polymer layer is from about 2 μm to about 30 μm.

15. The device of claim 8, further comprising a substrate attached to the first electrode layer at the side opposite the polymer layer, said substrate comprising at least one of soda lime glass, silica glass, borosilicate glass, gallium nitride, gallium arsenide, sapphire, quartz glass, polyethylene terephthalate, and polycarbonate.

16. The device of claim 15, wherein the substrate comprises a material possessing an index of refraction less than about 1.5.

17. The device of claim 8, wherein the first electrode layer and/or second electrode layer comprises conducting films independently selected from the group consisting of metal oxides, metals, and organic films, with an optical density less than about 0.2.

18. The device of claim 8, wherein the photorefractive material comprises organic or inorganic polymers exhibiting photorefractive behavior and possessing a refractive index of about 1.7.

19. The method of claim 1, wherein the one or more polymer layers have a relative dielectric constant from about 2 to about 15.

20. The device of claim 8, wherein the one or more polymer layers have a relative dielectric constant from about 2 to about 15.

* * * * *